United States Patent [19]

Kropa

[11] Patent Number: 4,972,044
[45] Date of Patent: Nov. 20, 1990

[54] JUNCTION BOX INCLUDING CABLE CLAMPS

[76] Inventor: Gomer Kropa, 252 Main St., Centerville, Mass. 02632

[21] Appl. No.: 305,642

[22] Filed: Feb. 2, 1989

[51] Int. Cl.$^5$ .............................................. H02G 3/08
[52] U.S. Cl. .................................................. 174/65 R
[58] Field of Search ...................... 174/65 R; 220/3.2; 439/449, 470, 472

[56] References Cited

U.S. PATENT DOCUMENTS

| | | | |
|---|---|---|---|
| 3,410,582 | 11/1968 | Appleton | 285/128 |
| 3,895,732 | 7/1975 | Robinson et al. | 220/3.5 |
| 4,071,159 | 1/1978 | Robinson et al. | 220/3.2 |
| 4,150,250 | 4/1979 | Lundeberg | 174/65 SS |
| 4,304,495 | 12/1981 | Neff et al. | 174/65 R |
| 4,306,109 | 12/1981 | Nattel | 174/65 R X |
| 4,366,343 | 12/1982 | Slater et al. | 174/65 R |
| 4,389,535 | 6/1983 | Slater et al. | 174/65 R |
| 4,402,565 | 9/1983 | Poliak | 439/460 |
| 4,436,952 | 3/1984 | Lockwood | 174/65 R |
| 4,591,658 | 5/1986 | Bauer et al. | 174/65 R |
| 4,605,816 | 8/1986 | Jorgensen et al. | 174/65 R |
| 4,724,282 | 2/1988 | Troder | 174/65 R |

FOREIGN PATENT DOCUMENTS 1396790 6/1975 United Kingdom .

OTHER PUBLICATIONS

Photographs of RACO junction boxes.

*Primary Examiner*—Leo P. Picard
*Assistant Examiner*—David A. Tone
*Attorney, Agent, or Firm*—Bromberg & Sunstein

[57] ABSTRACT

A plastic electrical junction box having integrally formed resilient arms for clamping a cable. The arms are formed with plural segments which are joined at bends.

10 Claims, 5 Drawing Sheets

JUNCTION BOX INCLUDING CABLE CLAMPS

BACKGROUND OF THE INVENTION

1. Field of the Invention

The present invention relates generally to the field of electrical junction boxes. In particular, the invention relates to electrical junction boxes including integrally formed cable clamping means.

2. Description of the Prior Art

Electrical junction boxes are safety enclosures that are used to physically isolate parts of a circuit, and are typically used where branching or switching occurs. Openings are provided in the walls of a junction box to receive electrical cable, and the branching or switching circuitry is housed entirely within the box. Although junction boxes have traditionally been made out of metal, recently thermoplastics have been used.

It is considered highly desirable to provide means for clamping the electrical cable passing through the openings in the walls of the junction box. Without such clamping means, electrical cable could accidentally be pulled out of the junction box with resulting damage to the circuitry within the box. For ease of manufacture and use, it is further considered desirable for the cable clamping means to be integrally formed as part of the junction box.

Thus, for example, U.S. Pat. No. 4,605,816 discloses a molded plastic junction box with integrally formed clamping "arms" that are disposed across the cable openings. These clamping arms are deflectable to allow electrical cable to be passed through the openings, but are resilient enough so that a clamping arm "squeezes" the cable against a corresponding side of the cable opening. Each clamping arm and each corresponding cable opening side are provided with integrally formed teeth that cooperate with each other to engage and clamp the inserted cable.

U.S. Pat. No. 4,591,658 discloses a clamping attachment for use with an electrical junction box. The attachment is formed of a thermoplastic material and includes a resiliently flexible clamping leg that functions in a manner similar to the clamping arm disclosed in U.S. Pat. No. 4,605,816. The clamping attachment is provided at one end with an integrally formed mount for affixing the attachment proximate to cable openings in the junction box. The other end of the clamping attachment includes an integrally formed clamping head that at least partially overlies a given cable opening and is formed with serrations that bite into the surface of the cable. In one embodiment of the invention, as shown particularly in FIGS. 6, 9, 12, 15 and 18, the clamp leg forms a curved structure. The clamps have an apparently uniform cross section. When an electrical cable is passed through a cable opening, both the portion of the curve proximate to the mount and the central bend of the curve are urged open.

U.S. Pat. No. 4,724,282 discloses a clamping arrangement that is similar to the approach taken in U.S. Pat. No. 4,605,816, and U.S. Pat. No. 4,591,658. In U.S. Pat. No. 4,724,282, metal clips are disposed proximate to the cable openings. Similar to the above patents, insertion of an electrical cable through an opening in the box resiliently deflects the clip, and the cable is held in place by squeezing action by the clip against the wall of the junction box. U.S. Pat. No. 4,724,282 further discloses slots in which the clips are mounted.

U.S. Pat. Nos. 1,396,790, 4,402,565, 4,150,250 and 4,306,109 disclose various other arrangements for engaging and connecting electrical cable.

SUMMARY OF THE INVENTION

The present invention provides a junction box including a plurality of cable openings and a corresponding plurality of resilient clamp arms. Each clamp arm includes an engagement end for engaging against a cable inserted into the box and a mounting end affixed to the body. The arm includes a first segment extending from the engagement end to a first bend and a second segment extending from the first bend to a second bend, the second bend being in an opposite direction from the first bend. Insertion of a cable through a cable opening causes deflection of the clamp arm, such that the first bend opens and the second bend closes.

In a preferred embodiment, the second segment is more flexible than the first segment. One way of accomplishing this is for the second segment to have a section modulus of less magnitude than that of the first segment.

In a further preferred embodiment, a limit stop is disposed proximate to the second segment to limit motion of the second segment about the second bend so as to reduce the risk of fracture of the clamp arm at the second bend.

In a preferred embodiment, the engagement end of the clamp arm includes a series of teeth disposed approximately parallel to one another for engaging and securing a cable inserted into the box, each of the teeth having a vertical dimension. A first tooth is detachably secured to the body of the junction box and a second tooth has a vertical dimension sufficiently greater than the vertical dimension of the first tooth, such that upon detachment of the first tooth from the body of the box and insertion of a cable into the box, the cable is engaged substantially more by the second tooth than by the first tooth.

DETAILED DESCRIPTION OF SPECIFIC EMBODIMENTS

The present invention provides an advantageous cable clamping structure that can be integrally formed into an electrical junction box. The clamping structure comprises a resiliently deflectable arm with a toothed cable engagement head. The arm is disposed proximate to a cable opening in the junction box, such that the engagement head and a segment of the arm substantially cover the cable opening. When an electrical cable is inserted into the opening, the clamping arm is deflected away from the opening. As set forth in detail below, the geometry of the clamping arm causes the resilience of the clamping arm to urge the engagement head transversely against the cable in such a way as to retard pulling of the cable out of the junction box.

As set forth below, the clamping arm includes two bends in opposite directions. These bends increase the range of motion of the clamping arm without significantly decreasing its strength or resilience. Thus, the structure set forth herein represents an improvement over the prior art, which does not teach or disclose any structures embodying this particular mechanical economy. Because of its geometry, the present invention is suitable for use with thermoplastic junction boxes that are manufactured using known one-piece molding techniques. The present invention therefore represents an improvement over prior art structures requiring multi-piece construction.

Figure 1:
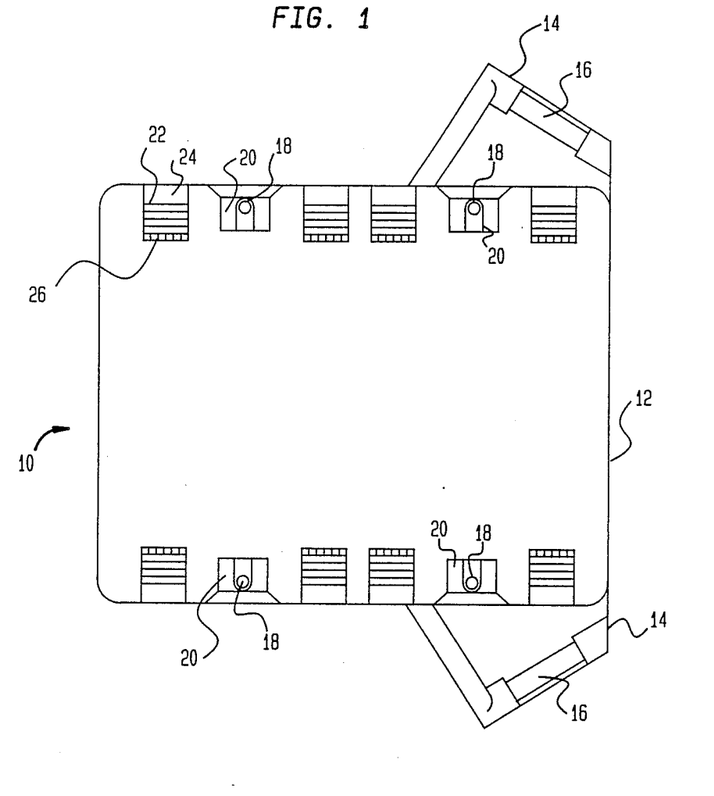
FIG. 1 shows a top view of a preferred embodiment of a junction box according to the present invention.
Figure 2:
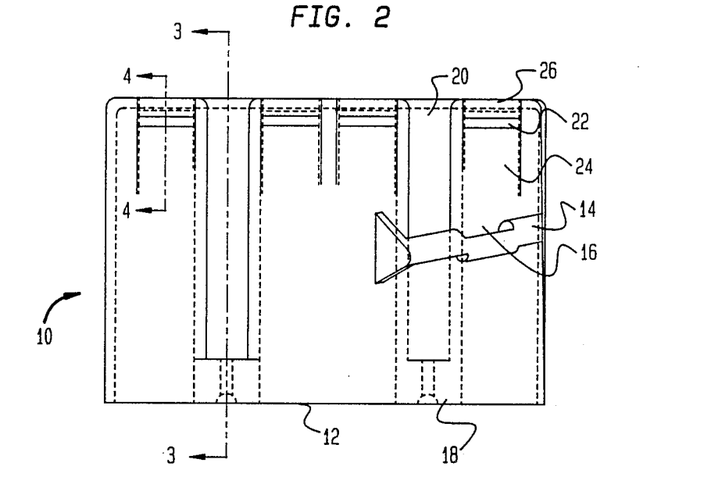
FIG. 2 shows a side view of the preferred embodiment shown in FIG. 1.

FIGS. 1 and 2 show, respectively, top and side views of a preferred embodiment of an electrical junction box 10 according to the present invention. The junction box 10 includes a central hollow body 12 which houses the junction circuitry. The hollow body 12 is provided along its outside walls with mounting flanges 14. Mounting flanges 14 are further provided with grooves 16 that receive nails, or other mounting structures. The body 12 further includes eyelets 18 for receiving bolts or other means for attaching the switch, plugs or faceplate to the junction box 10. The eyelets 18 are disposed within side grooves 20 that run the length of the outside walls of body 12. Thus, when a bolt is inserted into an eyelet 18, a substantial portion of the threaded shaft of the bolt is contained within a groove 20.

The body 12 is provided with a plurality of cable engagement heads 22 that are mounted to a corresponding plurality of deflectable resilient clamping arm members 24. Each engagement head 22 and clamping arm member 24 is disposed in relationship to body 12 in such a way that the deflection of these elements towards the interior of the body 12 defines an aperture to receive electrical cable. However, prior to deflection, the outer surface of each engagement head 22 and clamping arm member 24 is substantially continuous with the outside walls of body 12. This is a desirable feature because it results in a compact structure that can readily be mounted into a wall or ceiling. Further, because each engagement head and clamping arm member is substantially continuous with the outside walls of the body, this minimizes the risk that dust or moisture will enter the interior of the junction box, or that sparks will fly from the junction circuitry to the exterior of the box.

In the depicted preferred embodiment, each engagement head 22 is provided with serrations, or teeth, to provide a more certain engagement of each head against electrical cable. The particular configuration of these serrations are discussed in greater detail below.

The depicted preferred embodiment further provides a series of molded breakaway tabs 26 for attaching each engagement head to the body of the junction box 12. These tabs 26 serve to hold unused engagement heads in place, thus preventing them from being accidentally deflected during mounting. Thus, these breakaway tabs tend to preserve the substantial continuity of the outer wall of the junction box; as discussed above, this is considered to be advantageous. It is contemplated that each engagement head 22 can be readily disengaged from the body of the junction box 12 by breaking tabs 26 with a screwdriver, or similar tool. It should be noted that although breakaway tabs 26 are considered to be a desirable feature, they are not an indispensable element in the present invention.

Figure 3:
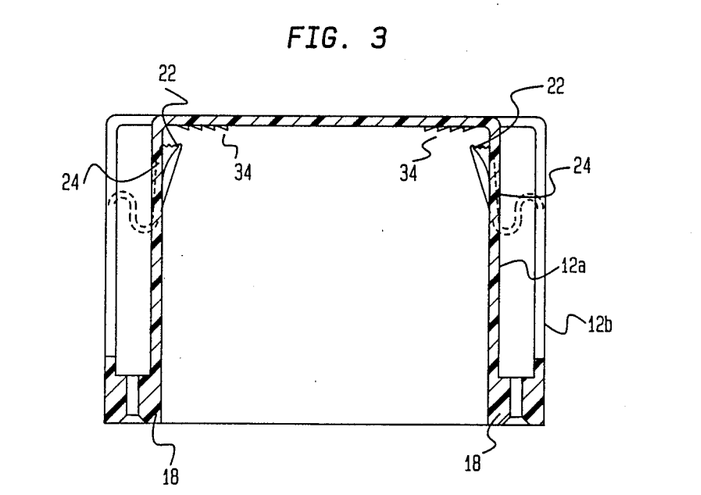
FIG. 3 shows a cross section of the preferred embodiment shown in FIG. 2 taken through the III—III plane.

FIG. 3 shows a cross section of the preferred embodiment shown in FIG. 2, taken through the III—III plane. FIG. 3 depicts the physical relationship of clamping arm member 24 and engagement head 22 to the body of the junction box 12. As shown in FIG. 3 and as discussed above, clamping arm member 24 is substantially coplanar with inner wall of the body of the junction box 12a. Inner wall 12a and outer wall 12b of the body of the junction box together define groove 20, described above.

An electrical cable is passed into the interior of the junction box by urging the cable into the space between the top of engagement head 22 and the proximal portion of the exterior surface of the body 12 of the junction box. The urging of the cable into this space causes clamping arm member 24 and engagement head 22 to be deflected towards the interior of the body of the junction box. The resilience of the clamping arm member 24 results in an upward clamping force being exerted by the engagement end against the inserted cable. This in turn results in a squeezing of the inserted cable between the engagement end and the proximal portion of the interior surface of the body of the junction box.

It will be seen that the passing of electrical cable into the body of the junction box tends to increase the deflection of the clamping arm member 24 and engagement end 22, thereby widening the cable-receiving aperture. This in turn means that relatively little resistance is offered by the clamping arm member and engagement head as cable is inserted.

However, it will further be seen that insertion of the cable is not mechanically symmetric to pulling cable out of the junction box. The pulling of cable out of the junction box tends to decrease the deflection of the clamping arm member and the engagement end, thereby narrowing the cable-receiving aperture. This results in greater friction between the engagement end and the cable, as well as between the cable and the proximal portion of the interior surface of the junction box, which in turn results in these structures offering relatively great resistance to a cable being pulled out of the box.

This assymetry between insertion of a cable and attempting to pull the cable out is highly advantageous. Damage to junction circuitry typically arises from cable being accidentally yanked out of a junction box, thereby breaking key electrical connections. It is highly unlikely that damage would result to the junction circuitry from cable accidentally being inserted into the junction box. First of all, because insertion of the cable requires a directed urging of the cable substantially along its longitudinal axis, it is relatively improbable that cable would be inserted accidentally. Second, even if such an accidental insertion were to occur, it would be virtually impossible for such an insertion to unseat any electrical connections.

If desired, the user may readily pull a cable out of the junction box by manually deflecting the engagement head and clamping arm member to maintain a relatively wide aperture, thereby freeing the cable.

As mentioned above, engagement head 22 is preferably serrated, or toothed, to enhance gripping of an inserted cable. Typically, cable insulation material is deformable enough to allow the serrations, or teeth, of the engagement head to dig into the insulation material, thereby creating a strong hold when the cable is pulled out of the junction box. The present preferred embodiment further provides a corresponding set of serrations 34, or teeth, along the proximal portion of the interior surface of the junction box. Thus, in the present embodiment, an inserted cable is firmly gripped on two sides by serrations that dig into that cable's insulation material.

It will be seen that the flex characteristics of the clamping arm 24 are dependent on its geometry. The present invention provides a particularly advantageous geometry that results in a structure with an optimal combination of flexibility, strength, and compactness. The geometry of the clamping arm 24 and engagement end 22 are more clearly set forth in FIG. 4, which shows an enlarged cross section of the preferred embodiment shown in FIG. 2, taken through the plane IV—IV. In this embodiment, it will be seen that engagement end 22 is an integral part of clamping arm member 24. It is contemplated that these elements will be molded together at the same point in the manufacturing process, using techniques known in the art.

Figure 4:
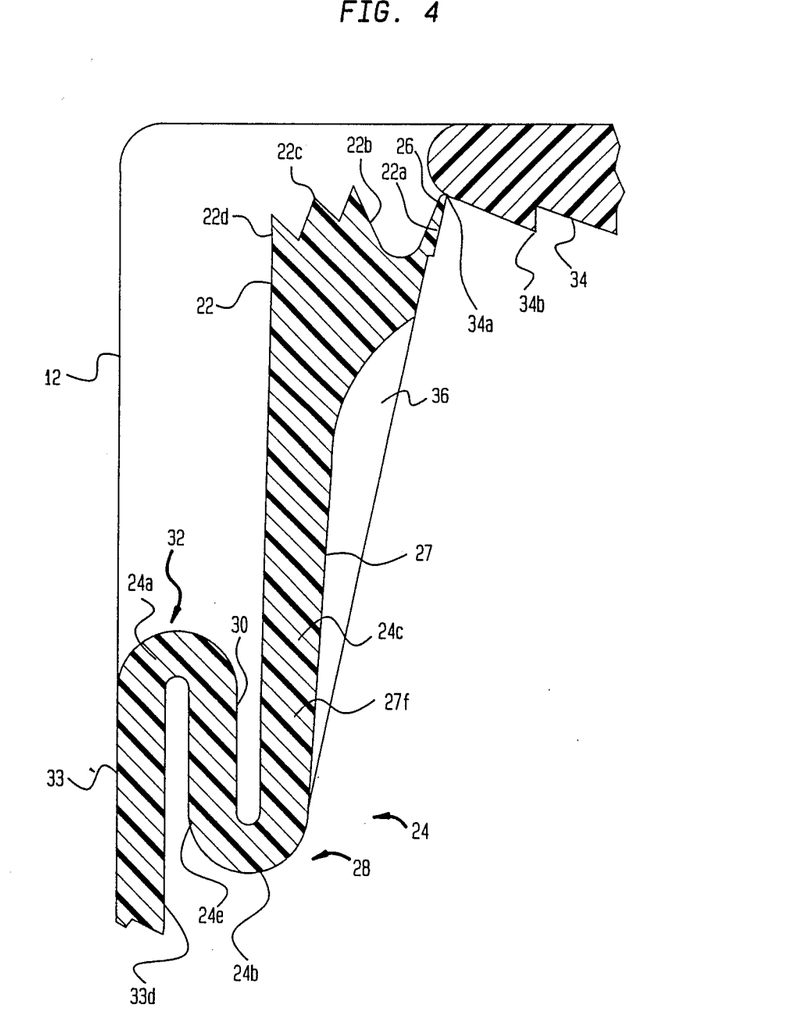
FIG. 4 shows an enlarged cross section of the preferred embodiment shown in FIG. 2 taken through the IV—IV plane.

Clamping arm 24 includes various segments and regions, each of which contribute to the overall flexing characteristics of the structure. As shown in FIG. 4, first segment 27 connects engagement end 22 with first bend region 28. First bend region 28 is connected to second bend region 32 by second segment 30. Finally, second bend region 32 is connected to base segment 33, which is affixed to the wall 12 of the body of the junction box. It is contemplated that all of these segments and regions will be integrally formed with the body of the junction box, using molding techniques known in the art.

As shown in FIG. 4, the present preferred embodiment further includes a reinforcing rib member 36 that serves to increase the rigidity of first segment 27 particularly in the section from point 24c to the engagement end. An increase in rigidity of first segment 27 increases the upward clamping force exerted by the engagement end 22 against an inserted cable.

Insertion of an electrical cable into the junction box will cause overall deflection of clamping arm 24. The overall inward deflection of the clamping arm actually reflects various degrees of deflection of the component parts of the clamping arm. The clamping arm can be designed so that greater deflection occurs between points 24a and 24b. There are several ways to design the clamping arm to perform this way. One way is to make the second segment more flexible which can be done by narrowing the clamp arm between points 24a and 24b, thereby decreasing the section modulus of the clamp arm between points 24a and 24b.

One of the advantages of this embodiment of the present invention is that it allows the relatively easy insertion of cables by initially having a smaller force resisting the deflection of the clamp arm, and it better resists the unintentional removal of the cable by providing a greater force clamping against the cable. When a cable is initially being inserted through the opening almost all of the significant deflection occurs between points 24a and 24c, i.e., both the first and second segment are being deflected. As noted above, the reinforcing rib member 36 makes the clamp arm quite rigid in the region that the rib attached to. The base segment 33 is also quite rigid, because it is attached to wall 12. Thus, substantially all of the bending occurs between points 24a and 24c on the clamping arm 24. If enough force is applied, i.e., if the cable is thick enough, then eventually point 24e on the clamp arm will hit point 33d on the base segment 33. After point 24e hits the base segment 33, substantially all of the deflection occurs between points 24b and 24c in the clamp arm. Because the deflection is occurring over a shorter length of the clamp arm, further deflection requires greater amount of incremental force than when the cable was just starting to push back the clamp arm, i.e., before point 24e hits the base segment 33. Thus, it can be said that the beginning of the insertion of the cable is met by a relatively small resistance from the clamp arm, but when the cable is completely inserted (assuming that the cable is large enough to cause point 24e to hit base segment 33) a greater resistance is applied to the cable by the clamp arm.

If the section modulus of the second segment is made smaller, or if the second segment is otherwise made more flexible, then the initial resistance against the insertion of the cable can be lowered even more. When point 24e hits the base segment 33, the resistance increases because less of the clamp arm is undergoing significant deflection and because the only part of the clamp arm that is undergoing significant deflection (the section between points 24b and 24c) has a greater section modulus, and is therefore less flexible, than the section between points 24a and 24b. It can be seen that lowering the section modulus of the second segment (by making it narrower) does not necessarily affect the strength of the structure significantly. The clamp arm can be designed so that point 24e hits the base segment, and thereby prevent further deflection of the second segment, before the second segment is in danger of breaking. Thus, it can be seen that the structure of the clamp arm ideally would approach the behavior of a uniformly stressed beam, which allows the greatest deflection without exceeding the yield strength of the material.

Thus, one advantage of the present invention is that it provides a structure that without a significant reduction in strength can provide a relatively small resistance to a cable as it is being inserted into the junction box (before point 24e hits base segment 33) but can provide a relatively large resistance to the removal of the cable (assuming point 24e hits base segment 33). Of course, even if the point 24e on the clamp arm does not hit the base segment 33, the clamp arm can still function properly, because, as noted above, the structure of the clamp arm and the cable opening is such that when one tries to pull the cable out of the box the clamp arm is pulled in such a direction as to decrease the size of the cable-receiving aperture, thereby tightening the hold on the cable.

A second advantage of the clamp arm structure is that the cable opening is smaller than would be the case in a clamping arm not incorporating the present geometry. As discussed above, it is considered advantageous to minimize the size of the openings in order to prevent foreign matter from entering the junction box, and to prevent sparks from exiting the junction box.

Although FIG. 4 shows a tight S curve with first segment 27, second segment 30, and base segment 33 all substantially parallel to each other, and with extremely sharp first and second bend regions 28 and 32, it would be equally within the spirit of the invention to use a looser structure, with more relaxed bend regions.

The preferred embodiment depicted in FIG. 4 further includes an advantageous arrangement for the serrations on engagement head 22. As shown in FIG. 4, engagement end 22 is provided with three principal teeth 22b, 22c, and 22d. As discussed above, it is advantageous to provide a series of breakaway tabs 22a, or other attachment means, to removably affix engagement head 22 to the body of the junction box. Corresponding serrations 34 are provided on the proximal surface of the interior of the body of the junction box.

In the prior art, these breakaway tabs are typically affixed to the first tooth on an engagement head in order to accommodate the requirements of standard molding technologies. However, the use of breakaway tabs presents a potential problem. Once the tabs have been broken, the edge of the first tooth and the corresponding surface on the body of the junction box become quite jagged. Depending on the particular electrical cable used, these engagement surfaces may become sufficiently jagged as to cut entirely through the insulation of the cable.

This potential problem is overcome by the present structure. Although, as in the prior art, the breakaway tabs 26, are affixed to the first tooth 22a, the geometry of the engagement head teeth, the clamping arm, and the serrations on the proximal portion of the interior surface of the body of the junction box are such that, unlike in prior art structures, the primary engagement structures for clamping an inserted cable is not the first tooth 22a and surface edge 34a, but rather second tooth 22b and corresponding tooth 34b. This is accomplished in the present embodiment by making first tooth 22a on the engagement head 22 shorter than second tooth 22b. Because second tooth 22b and corresponding tooth 34b present smooth edges, there is a significantly smaller risk that the engagement head will accidentally cut through the insulation of an inserted cable.

It will be seen that it is also within the spirit of the invention for another tooth rather than the second tooth to be the primary engagement site for an inserted cable. This can be accomplished by adjusting the relative length of the available teeth.

Figure 5:
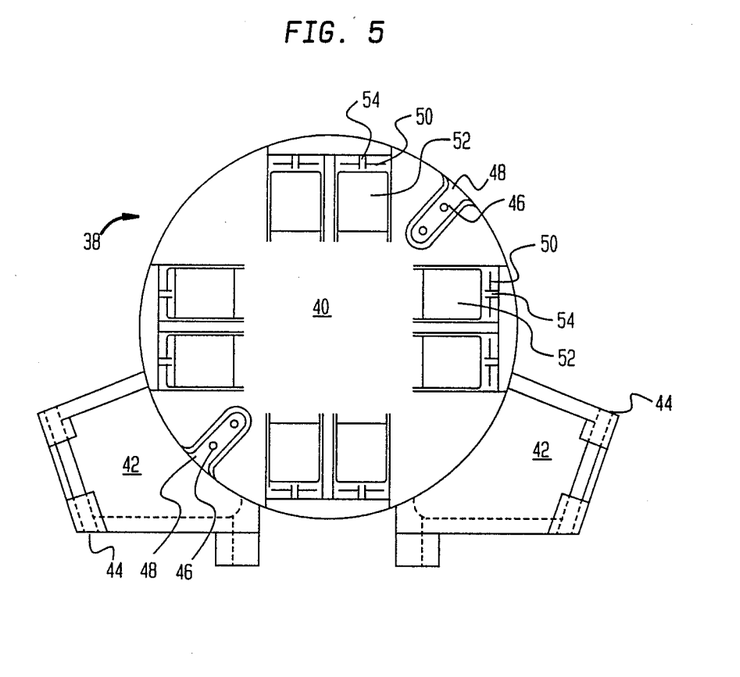
FIG. 5 shows a top view of an alternative preferred embodiment of a junction box according to the present invention.
Figure 6:
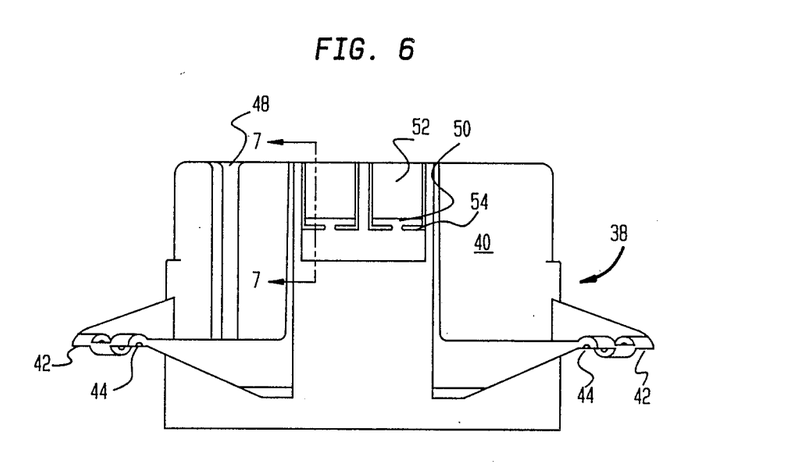
FIG. 6 shows a front view of the preferred embodiment shown in FIG. 5.

FIGS. 5 and 6 respectively show top and front views of an alternative preferred embodiment of a junction box 38 in accordance with the present invention. This embodiment is particularly suitable for use as a ceiling junction box. The body 40 of the junction box displays a substantially circular profile, rather than the rectangular profile of the embodiment shown in FIGS. 1-4. Junction box 38 further including mounting wing members 42, with grooves 44 for receiving nails or other attachment devices. Eyelets 46 are provided for receiving bolts or other means for attaching a faceplate to the body 40 of the junction box. These eyelets are disposed within grooves 48 that run the height of body 40. It is contemplated that these grooves 48 will house the threaded shafts of the bolts used to affix the faceplate to the body of the junction box 40. The junction box includes a plurality of engagement heads 50 that are mounted to clamping arm members 52. As in the embodiment shown in FIGS. 1-4, each engagement head 50 and associated clamping arm member 52 is resiliently deflectable into the interior of the body of the junction box 40. When deflected, the engagement head and the proximal surfaces of the body of the junction box define an aperture to receive electrical cable. A breakaway attachment tab 54 serves to removably attach each engagement head 52 to a corresponding point on the body of the junction box.

As in the previously discussed embodiment, electrical cable is urged between an engagement head and the corresponding surface of the body of the junction box. The geometry and the resilience of the clamping arm cause the engagement head to be urged against the cable, thereby tending to hold it in place against forces that would otherwise pull the cable out of the box.

Figure 7:
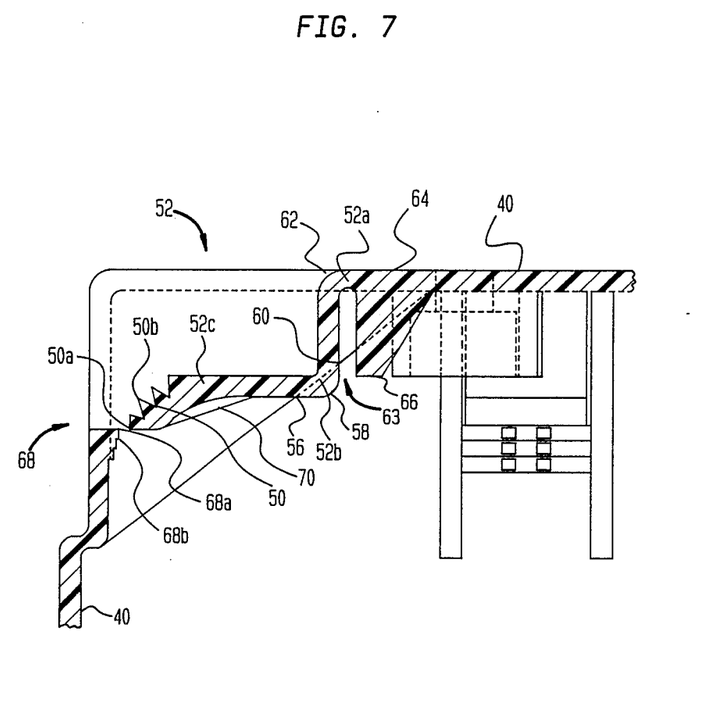
FIG. 7 shows an enlarged cross section of the preferred embodiment shown in FIG. 6 taken through the VII—VII plane.

FIG. 7 shows an enlarged cross section of the preferred embodiment of the invention shown in FIG. 6, taken through the plane VII—VII. In this embodiment, engagement head 50 is actually an integrally formed part of clamping arm member 52. The geometry of the clamping arm member 52 includes a first segment 56 that connects the engagement head 50 to first bend region 58. Second segment 60 connects first bend region 58 to second bend region 62. Second bend region 62 then leads into base segment 64. A reinforcing rib 70 can be attached to the clamp arm as shown in FIG. 7. This rib 70 serves to make more rigid that portion of the clamp arm to which the rib 70 is attached.

The interrelationship between these segments and regions is similar to that of the previously discussed embodiment. As electrical cable is urged into the box, first bend region 58 tends to open, and second bend region 62 tends to close gap 63.

The cable, when inserted into the junction box, applies a force to the clamping arm. Since the second segment 60 is further from the insertion point, the bending moment in the second segment is greater than in the first segment. Thus, assuming that both segments are equally flexible (i.e., they have the same modulus of elasticity and the same section modulus), then for a given deflection of the clamping arm, the component of the deflection attributable to the deflection of the second segment is greater than that of the first segment. As with the embodiment depicted in FIG. 4, the flexibility of the various components of the arm can be adjusted (by narrowing or thickening the appropriate segments, for example.)

Of note is the inclusion of limit stop element 66, which limits the deflection of second segment 60. Limits top 66 accomplishes two things: First, the limit stop serves to modify the overall flexibility of the clamp arm as the clamp arm is being deflected. In this respect the limit stop serves the same function as the base segment in the FIG. 4 embodiment. Thus, it can be said that the base segment is a limit stop. When a cable is being inserted into the cable opening, the clamp arm deflects, mostly as a result of the deflection between points 62a and 62c on the clamp arm. When the clamp arm hits the limit stop, most of the deflection occurs between points 62b and 62c. Since a smaller portion of the clamp is undergoing substantial deflection, the incremental force needed to deflect the clamp arm further increases. Thus, as with the embodiment depicted in FIG. 4, the embodiment depicted in FIG. 7 provides a clamp arm that exerts relatively little resistance on the cable as the cable is first being inserted, but exerts greater resistance on the cable when the cable is fully inserted (assuming that the cable is thick enough to cause the clamp arm 52 to hit the limit stop 66). Thus, the cable is relatively easy to insert, but more difficult to pull out. As in the FIG. 4 embodiment, this easy-to-put-in-and-hard-to-pull-out behavior can be increased by making the second segment 60 narrower and/or the first segment thicker.

The second thing that the limit stop is useful for is that it can be situated in relation to the clamp arm so that it can prevent excessive deflection in the area of the clamp arm between points 52a and 52b. This can be important since this area of the clamp arm, between points 52a and 52b, is subject to a greater bending moment and therefore more likely to fracture or otherwise fail. Furthermore, as noted above, this section may also be narrower in order to make it more flexible and therefore even more likely to fail. The limit stop 66 can prevent this section from bending so much that it fails. After the clamp arm 52 hits the limit stop 66, substantially all of the deflection the clamp arm undergoes is due to the deflection in the section of the clamp arm between points 52b and 52c. As noted above, this section can be made thicker than the section between points 52a and 52b, thereby making it less prone to fail.

Thus, like the FIG. 4 embodiment, the FIG. 7 embodiment provides a structure that without a significant reduction in strength can provide a relatively small resistance to a cable as it is being inserted into the junction box (before the clamp arm hits the limit stop) but can provide a relatively large resistance to the removal of the cable (assuming the clamp arm hits the limit stop).

Unlike the tight S-curve of the clamping arm member in the preferred embodiment shown in FIGS. 1-4, the present preferred embodiment displays a more relaxed contour. The angle between first segment 56 and second segment 60 approaches a right angle. Similarly, the angle between second segment 60 and base segment 64 also approaches a right angle.

The engagement head 50 includes a series of serrations, or teeth. In this embodiment, the breakaway tab is not connected to an engagement tooth, but rather to the outside edge of the engagement head 50a. Thus, the primary electrical cable engagement surface on engagement head 50 is tooth 50b, which provides a smooth surface. The geometry of the corresponding serrations 68 on the inner surface of the body of the junction box 40 is such that the primary engagement surface there is smooth-surfaced serration 68b, and not tab attachment site 68a. As discussed above, the presentation of smooth engagement surfaces is a highly desirable feature.

What is claimed is:

1. A junction box comprising:
   a body;
   a resilient clamp arm having firs and second ends, a cable engagement head being affixed to the first end, the second end being mounted on the body such that deflection of the clamp arm causes a cable-receiving aperture to be defined, the clamp arm including a firs segment extending from the engagement head to a fir bend, and a second segment extending from the first bend to a second bend, the second bend being in an opposite direction from the first bend; and
   limit stop means mounted to the body and disposed proximate to the second segment to limit motion of the second segment upon deflection of the clamp arm,
   such that when a cable is inserted into the junction box, the deflection of the clamp arm causes opening of the firs bend and closing of the second bend, such that the engagement head of the clamp arm is urged against the cable, due to the resilience of the clamp arm.

2. A junction box comprising:
   a body;
   a resilient clamp arm having first and second ends, a cable engagement head being affixed to the first end, the second end being mounted on the body such that deflection of the clamp arm causes a cable-receiving aperture to be defined, the clamp arm including a first segment extending from the engagement head to a first bend, and a second segment extending from the first bend to a second bend, the second bend being in ann opposite direction from the first bend, such that when a cable is inserted into the junction box, the deflection of the clamp arm causes opening of the first bend and closing of the second bend, such that the engagement head of the clamp arm is urged against the cable, due to the resilience of the clamp arm, and
   wherein the body includes an inner surface and the first and second segments are approximately parallel to one another and to the inner surface in the region of the body where the second end is mounted.

3. A junction box according to claim 2, wherein the clamp arm and the region of the inner surface where the second end is mounted are configured to produce a generally S-shaped structure.

4. A junction box according to claim 1, wherein the engagement head includes a series of teeth disposed approximately parallel to one another for engaging and securing a cable inserted into the box and each of the teeth has a vertical dimension and wherein a first tooth is detachably secured to the body of the junction box and a second tooth has a vertical dimension sufficiently greater than the vertical dimension of the first tooth that upon detachment of the first tooth from the body of the box and insertion of a cable into the box the cable is engaged substantially more by the second tooth than by the first tooth.

5. A junction box comprising:
   a body;
   a resilient clamp arm having first and second ends, a cable engagement head being affixed to the firs end, the second end being mounted on the body such that deflection of the clamp arm causes a cable-receiving aperture to be defined, the clamp arm including a first segment extending from the engagement head to a first bend, and a second segment extending from the first bend to a second bend, the second bend being in an opposite direction from the first bend, such that when a cable is inserted into the junction box, the deflection of the clamp arm causes opening of the first bend and closing of the second bend, such that the engagement head of the clamp arm is urged against the cable, due to the resilience of the clamp arm, wherein the body includes an inner surface and the firs and second segments are disposed at approximately a right angle with respect to one another and the second segment is disposed at approximately a right angle with respect to the inner surface in the region of the body where the second end is mounted; and
   a limit stop mounted to the inner surface of the body and disposed proximate to the second segment to limit motion of the second segment upon deflection of the clamp arm, such that the risk of failure of the clamp arm at the second segment or the second bend is reduced.

6. A junction box comprising:
   a body; and
   a resilient clamp arm having first and second ends, a cable engagement head being affixed to the first end, the second end being mounted on the body such that deflection of the clamp arm causes a cable-receiving aperture to be defined, the clamp arm including a first segment extending from the engagement head to a first bend, and a second segment extending from the first bend to a second bend, the second bend being in an opposite direction from the first bend, such that when a cable is inserted into the junction box, the deflection of the clamp arm causes opening of the first bend and closing of the second bend, such that the engagement head of the clamp arm is urged against the cable, due to the resilience of the clamp arm, and wherein the engagement head includes a series of teeth disposed substantially parallel to one another for engaging and securing a cable inserted into the box, each of the teeth having a vertical dimension, and wherein a first tooth is detachably secured to the body of the junction box and a second tooth has a vertical dimension sufficiently greater than the vertical dimension of the first tooth that upon detachment of the first tooth from the body of the box and insertion of a cable into the box the cable is engaged substantially more by the second tooth than by the first tooth.

7. A junction box comprising:

a body; and a resilient clamp arm having fist and second ends, a cable engagement head being affixed to the first end, the second end being mounted on the body such that deflection of the clamp arm causes a cable-receiving aperture to be defined, the clamp arm including a first segment extending from the engagement head to a first bend, and a second segment extending from the first bend to a second bend, the second bend being in an opposite direction from the first bend, such that when a cable is inserted into the junction box, the deflection of the clamp arm causes opening of the first bend and closing of the second bend, such that the engagement head of the clamp arm is urged against the cable, due to the resilience of the clamp arm, and wherein the region of the clamp area consisting of the second segment and the second bend is more flexible than the region consisting of the first segment and the first bend.

8. A junction box, comprising:

a body; and a resilient clamp arm having first and second ends, a cable engagement head being affixed to the first end, the second end being mounted on the body such that deflection of the clamp arm causes a cable-receiving aperture to be defined, the clamp arm including a first segment extending from the engagement head to a first bend, and a second segment extending from the first bend to a second bend, the second bend being in an opposite direction from the first bend, such that when a cable is inserted into the junction box, the deflection of the clamp arm causes opening of the first bend and closing of the second bend, such that the engagement head of the clamp arm is urged against the cable, due to the resilience of the clamp arm, and wherein the second segment has a lower section modulus than the first segment.

9. A junction box according to claim 8, further comprising:

limit stop means mounted on the body and disposed proximate to the second segment to limit the motion of the second segment upon deflection of the clamp arm, such that the risk of failure of the clamp arm at the second segment or the second bend is reduced.

10. A junction box comprising:

a body; and a resilient clamp arm having a cable engagement head affixed to an end thereof, the clamp arm and the engagement head being mounted in the body such that deflection of the clamp arm and the engagement head causes a cable-receiving aperture to be defined, wherein the engagement head includes a series of teeth disposed approximately parallel to one another for engaging and securing a cable inserted into the box and each of the teeth has a vertical dimension and wherein a first tooth is detachably secured to the body of the junction box and a second tooth has a vertical dimension sufficiently greater than the vertical dimension of the first tooth that upon detachment of the first tooth from the body of the box and insertion of a cable into the box the cable is engaged substantially more by the second tooth than by the first tooth.

* * * * *